UNITED STATES PATENT OFFICE.

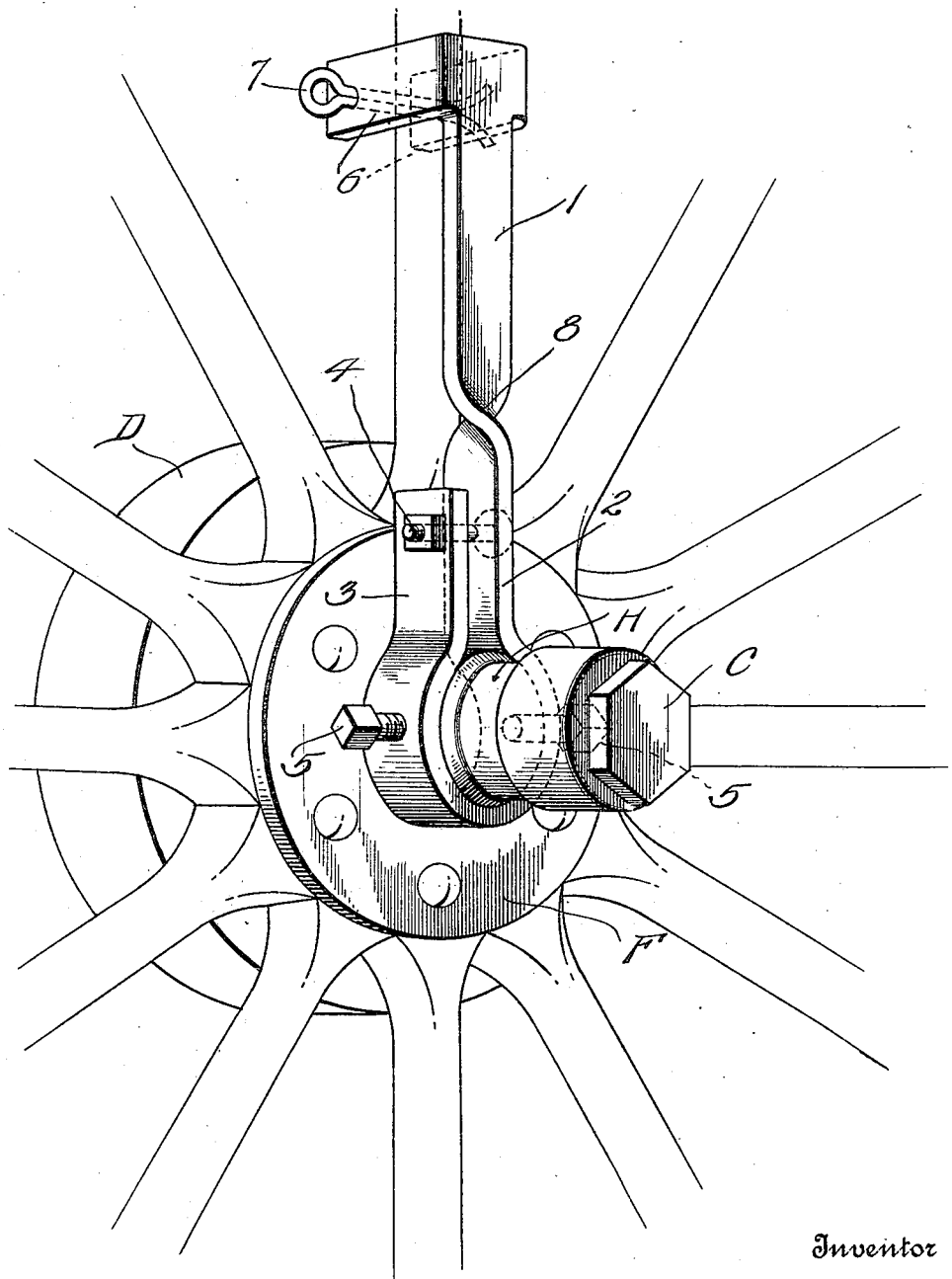

JOHN R. HUETHER, OF RUFF, WASHINGTON.

EMERGENCY ATTACHMENT FOR WHEEL HUBS.

1,410,570.   Specification of Letters Patent.   Patented Mar. 28, 1922.

Application filed July 11, 1921. Serial No. 483,987.

*To all whom it may concern:*

Be it known that I, JOHN R. HUETHER, a citizen of the United States, residing at Ruff, in the county of Grant and State of Washington, have invented certain new and useful Improvements in Emergency Attachments for Wheel Hubs; and I do declare the following to be a full, clear, and exact description of the invention, such as will enable others skilled in the art to which it appertains to make and use the same.

This invention relates to an improved emergency attachment for automobile wheel hubs, the same being especially but not necessarily designed for use in connection with the hubs of the type used in a Ford automobile.

The principal object of the invention is to provide an attachment of this class which is extremely simple in construction, the same being composed from a single metal bar bent to form a collar for frictionally gripping the hub and means for engaging one of the spokes of the wheel, the device in its entirety being extremely inexpensive to both the manufacturer and user and such that it can be readily attached and detached and will accomplish results equal to those of much more expensive and complicated devices now patented.

Other objects and advantages of the invention will be apparent during the course of the following description.

In the drawing, the figure represents an enlarged detail perspective view of an attachment constructed in accordance with this invention showing the same applied on a wheel.

In the drawing, H designates a hub which is provided on opposite sides of the central portion of the wheel with flanges F, the usual brake drum D being connected to the inner flange, and a removable cap C being arranged on the exposed portion of the hub.

It will be recalled that in many instances, the extreme strains to which the wheels are subjected on steep inclines in the path of travel of an auto often cause the inner integral flange F to break loose from the body portion of the hub, thus permitting the wheel to spin without being acted on by the driving means and in many instances resulting in serious accidents. As before pointed out, it is the aim of this invention to provide a temporary device for locking the wheel to the hub when such portion of the latter is broken.

In carrying out the invention, I preferably employ a flat metal bar 1 which is bent upon itself at one end to provide a hub-engaging collar 2. This collar is split to permit it to be easily slipped over the hub and engaged therewith and in order to render it effective, the free end 3 is drawn toward the body portion by means of a bolt and nut indicated generally by the numeral 4. In many instances, this bolt will be sufficient to bind the collar on the hub so as to impart rotation to the wheel even after the aforesaid inner flange is separated from the body of the hub. However, to insure effective results, I desire to employ two or more set screws 5 and pass these through the collar and bind the inner ends thereof against the hub as shown. As before indicated, the bar 1 is equipped at its opposite end with spoke-engaging means which in its preferred form is devised by equipping the bar at this end with angularly disposed spaced parallel ears 6 between which one of the spokes is received and held, that is, after the cotter pin 7 is passed through the holes in the free ends of these ears and disposed on the side of the spokes indicated in the drawing. To properly position the spoke-engaging means with respect to the hub-engaging collar, the bar is twisted intermediate its ends as indicated at 8.

In case the inner flange of the hub should separate from the body portion as previously described, it will be seen that the wheel can be again locked to the hub by simply slipping the hub-engaging collar 2 over the extended portion of the hub and tightening the nut on the bolt 4 so as to bind the collar tightly on the hub. To insure against possible displacement of the collar, the set screws 5 will likewise be tightened. Now, the ears 6 are permitted to straddle one of the spokes in the manner indicated and the cotter pin is passed through the openings in the free ends of these ears, connecting the device with the wheel and connecting the latter in turn with the hub so that the wheel will be rotated with the hub even though a portion of the latter is broken.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the subjoined claims may be resorted to if desired.

I claim:

1. An emergency attachment for wheel hubs comprising a bar having a split resilient collar at one end designed to be slipped onto the hub, means for binding said collar around the hub so as to frictionally grip the latter, and means at the opposite end of said bar for engaging one of the spokes of said wheel.

2. The structure set forth in claim 1, said collar being formed by bending one end of the bar upon itself.

3. An emergency attachment for wheel hubs comprising a metal bar provided at its upper end with spaced ears between which one of the wheel spokes is designed to be positioned, said ears being apertured adjacent their free ends, a cotter pin passing through said apertures, said bar being bent at its lower end to form a split hub-engaging collar, a clamping bolt passng through the free end of the collar and through the intermediate portion of said bar for binding the collar tightly on the hub, and set-screws passing through said collar and designed to engage the hub also.

In testimony whereof I have hereunto set my hand.

JOHN R. HUETHER.